T. FISHER.
HUB FOR DEMOUNTABLE WHEELS.
APPLICATION FILED MAY 20, 1920.
1,369,643. Patented Feb. 22, 1921.
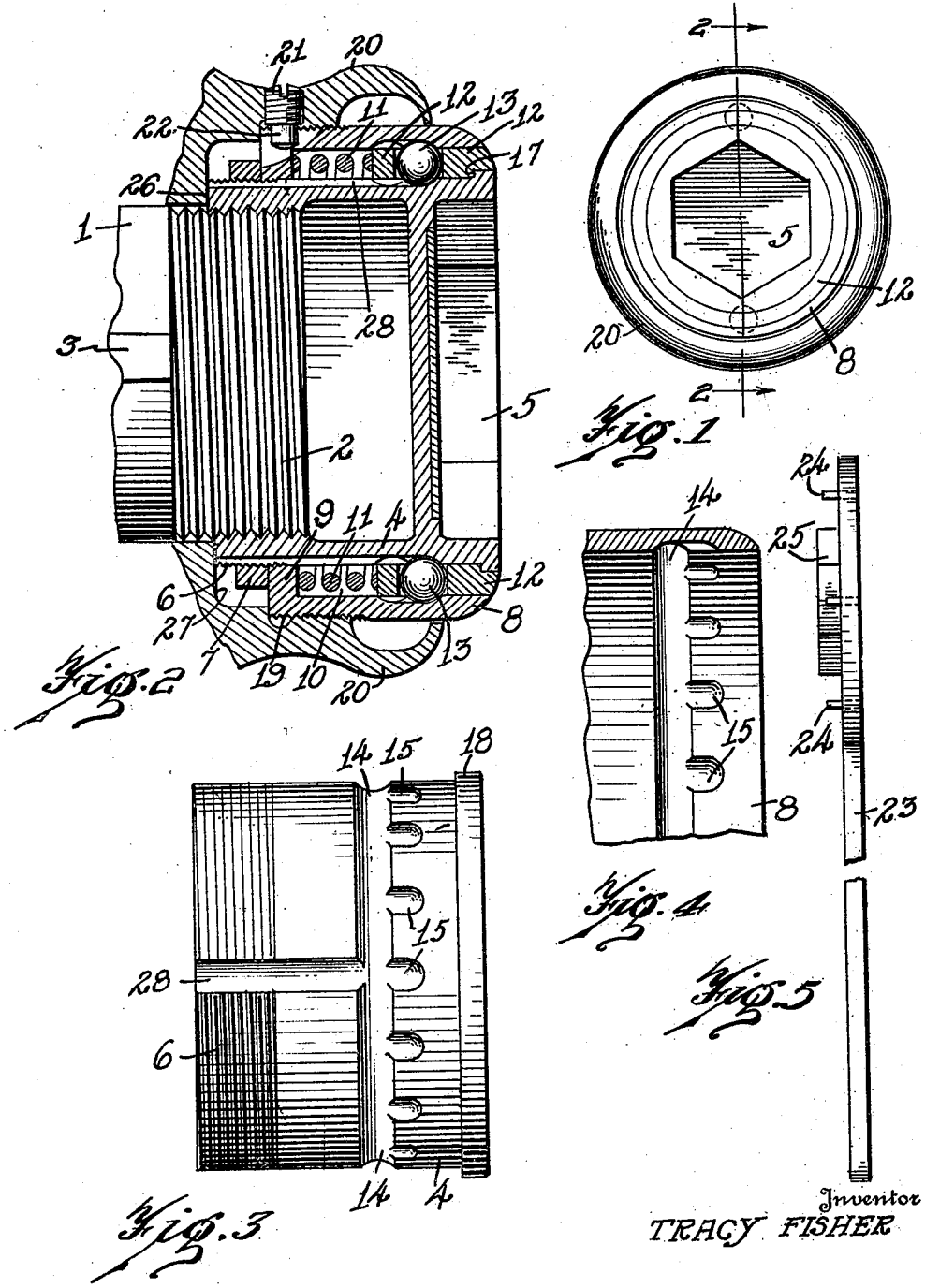
Inventor.
TRACY FISHER
By Charles E. Winner
Attorney

UNITED STATES PATENT OFFICE.

TRACY FISHER, OF HIGHLAND PARK, MICHIGAN.

HUB FOR DEMOUNTABLE WHEELS.

1,369,643. Specification of Letters Patent. Patented Feb. 22, 1921.

Application filed May 20, 1920. Serial No. 382,745.

*To all whom it may concern:*

Be it known that I, TRACY FISHER, a citizen of the United States, residing at Highland Park, county of Wayne, State of Michigan, have invented a certain new and useful Improvement in Hubs for Demountable Wheels, and declare the following to be a full, clear, and exact description of the same, such as will enable others skilled in the art to which it pertains to make and use the same, reference being had to the accompanying drawings, which form a part of this specification.

This invention relates to hub construction for demountable wheels and its object is to provide a simple and efficient means for detachably securing the wheel in place on an inner hub member mounted on the axle of the vehicle and lock the same from movement thereto. A novel feature of the invention is involved in the means for locking the inner and outer hub members together whereby they are firmly held from accidental displacement and may be quickly and readily dismounted. A further feature of the invention is involved in the construction of the cap member having threaded relation with the inner hub member and adapted by rotation in one direction to force the outer hub member into position on the inner hub member, the outer hub member in keyed relation therewith, the cap being adapted by rotation in the other direction to withdraw the outer hub member from the inner hub and means for locking the two members together. These objects and the several novel features of the invention are hereinafter more fully described and claimed and the preferred form of construction by which these objects are attained is shown in the accompanying drawings, in which—

Figure 1 is a side elevation of a wheel hub embodying my invention.

Fig. 2 is a section taken on line 2—2 of Fig. 1.

Fig. 3 is an elevation of the hub cap showing the ball grooves.

Fig. 4 is a similar view of a portion of the retainer.

Fig. 5 is a side elevation of the wrench for the hub cap.

As shown in Fig. 2 a wheel hub or inner hub member 1 of the usual type is provided, the said hub member being threaded at the end at 2 and being also provided with a key 3 as shown. Threaded on the end of the inner hub member at 2 is a hub cap 4 which is provided with a hexagonal recessed end 5 adapted to receive a socket wrench. This hub cap 4 is threaded at 6, the said thread 6 being much less in pitch than the threads 2 and an annular member 7 is provided fitting the thread 6. Fitting over the member 4 is a retainer 8 which is provided with an inwardly extending flange 9, the inner periphery of the said flange being supported on the outer cylindrical face of the member 4. In the space 10 between the members 4 and 8 I provide a spring 11, and positioned on this spring 11 and in the recess 10 is an annular member 12 in which is carried a pair of balls 13, the said members 4 and 8 being each provided with an annular groove 14 on the adjacent faces thereof providing a runway for the balls as indicated more particularly in Figs. 3 and 4. Equidistantly spaced about the outer and inner peripheries of the hub cap and retainer respectively are a number of longitudinally extending ball grooves 15 opening into the channel 14 in which, when the ball grooves are positioned in alinement, the balls 13 may be positioned, the spring 11 tending to force the balls 13 to such position. As will be noted from Fig. 2 the ring 12 extends to and is finished flush with the outer surfaces of the cap 4 and retainer 8 and is provided with an annular shoulder 17 adapted to engage the inner face of the annular flange 18 of the hub cap 4. As will be readily seen from Fig. 2, the spring member 11 forces the member 12 and balls 13 therein to the position shown flush with the outer surfaces of the hub cap and retainer respectively. The retainer 8 is provided with left hand threads at 19 and in threaded relation therewith is the outer hub member 20 to which the spokes of the wheel are adapted to be secured. To hold the member 20 from rotation in relation to the retainer 8 I provide a screw 21 threaded into the said member 20 and provided with an end 22 fitting in an aperture provided in the retainer 8 thereby securing the two parts together.

In operation a wrench 23 is provided as shown in Fig. 5 having a number of pins 24 adapted to engage the outer face of the annular member 12 and the wrench is provided with an outwardly extending hexagonal central member 25 adapted to fit the hexagonal recess 5 of the hub cap 4. When the wrench is applied to the hub the pins 24 thereon engage the outer face of the annular member 12 at which time the wrench may be forced into the hexagonal recess 5 of the hub cap causing the pins 24 of the wrench to move the annular member 12 inwardly against the tension of the spring 11. As the member 12 is moved inwardly the pair of balls 13 are carried inwardly thereby, the balls normally fitting the ball race 14 in the said members 4 and 8 when the wrench 23 has been correctly positioned. With the balls in the ball race 14 the hub cap 4 is free to rotate, rotation of the cap 4 by the said wrench in one direction threading the cap 4 farther onto the threads 2 of the hub 1 the face 26 of the member 4 engaging the face 27 of the member 20 and forcing the same farther onto the hub 1, rotation of the member 20 being prevented by the key 3 fitting a keyway therein. It is to be understood that two balls 13 are preferably provided in diametrical alinement and a considerable number of ball grooves 15 are provided so that at any point at which rotation of the hub cap 4 may be stopped a pair of ball grooves will be in alinement with the balls 13 to allow the balls 13 to be pressed therein by action of the spring 11 when the wrench is withdrawn from the hub. It can thus be seen that the locking of the hub members one to the other in this device is entirely automatic upon withdrawal of the wrench and, upon application of the wrench to the hub, the device is automatically unlocked and held in the unlocked position until the wrench is again disengaged. As will be noted from Figs. 2 and 3 the hub cap 4 is provided with a pair of ball grooves 28 extending throughout the length of the member 4 to allow the said member to be positioned within the member 8 or be withdrawn therefrom without disturbing the balls 13 and, by adjustment of the annular members 7 on the threads of the hub cap 4 the member 8 may be adjusted longitudinally.

From the foregoing description it becomes evident that the hub is very efficient in operation and provides an automatic means for locking the outer and inner hub member of a wheel together, the same lock locking the entire wheel to the inner hub member and providing a construction that effectively accomplishes the objects desired.

Having thus briefly described my invention, what I claim and desire to secure by Letters Patent of the United States is—

1. The combination of an inner hub member, an outer hub member, the inner hub member having terminal screw threads, a cap therefor revolubly mounted within the outer hub member and having threads for engaging the threaded end of the inner hub member, a retainer secured to the outer hub member, an annular channel in each adjacent face of the cap and retainer, a series of ball grooves opening into the said channels in the adjacent faces of the cap and retainer, and a pair of balls normally seating in the said ball grooves.

2. The combination of an inner hub member, an outer hub member, the inner hub member having terminal screw threads, the outer hub member being formed with a cylindrical portion greater in diameter than the diameter of the inner hub and extending beyond the outer end thereof, a screw threaded cap member revolubly mounted in said cylindrical portion, a retainer secured to the outer hub member, a series of ball grooves in the adjacent faces of the cap and retainer, and a pair of balls normally seating therein.

3. The combination of an inner hub member, an outer hub member, the inner hub member having terminal screw threads, a cap therefor revolubly mounted within the outer hub member and having threads for engaging the threaded end of the inner hub member, a retainer secured to the outer hub member, an annular ball groove in each adjacent face of the cap and retainer, a series of ball grooves extending longitudinally of the cap and retainer and opening into the annular ball grooves, a pair of balls normally seating in the said longitudinally extending channels and means for moving the balls into the annular channels.

4. The combination of an inner hub member, an outer hub member, the inner hub member having terminal screw threads, a cap member therefor revolubly mounted within the outer hub member and having threads for engaging the threaded end of the inner hub member, a retainer secured to the outer hub member, an annular ball groove in each adjacent face of the cap and retainer, a series of ball grooves extending longitudinally of the cap and retainer and opening into the annular ball grooves, an annular member between the cap and retainer, a spring engaging the annular member, a pair of balls carried by the annular member and yieldably positioned in the longitudinal grooves by the spring and annular member, the annular member being adapted to be depressed to position the balls in the annular grooves.

5. The combination of an inner hub member, an outer hub member, the inner hub member having terminal screw threads, a cap therefor revolubly mounted within the outer hub member and having threads for engaging the threaded end of the inner hub member, a retainer secured to the outer hub member, an annular member threaded onto the end of the inner hub member and adapted to engage the inner end of the retainer, the retainer and cap being spaced apart throughout a portion of their length, an annular groove in each adjacent face thereof, a series of longitudinally extending grooves opening therefrom, a pair of spring-pressed balls normally engaging the longitudinally extending grooves, and means for moving the balls into the annular grooves against the tension of the spring.

6. The combination of an inner hub member, an outer hub member, the inner hub member having terminal screw threads, a cap therefor revolubly mounted within the outer hub member and having threads for engaging the threaded end of the inner hub member, a retainer secured to the outer hub member, an annular ball groove in each adjacent face of the cap and retainer, a series of ball grooves extending longitudinally of the cap and retainer and opening into the annular ball grooves, an annular member between the cap and retainer, a spring engaging the annular member, a pair of balls carried by the annular member and yieldably positioned in the longitudinal grooves by the spring and annular member, the annular member extending flush with the outer faces of the retainer and cap, an annular shoulder on the said annular member engaging a companion shoulder on the cap and a wrench fitting the cap and provided with a number of pins adapted to depress the annular member and position the balls in the annular grooves when positioned in the cap.

In testimony whereof, I sign this specification.

TRACY FISHER.